J. D. CUTTER.
Machines for Measuring Silk in Spools.

No. 148,185. Patented March 3, 1874.

UNITED STATES PATENT OFFICE.

JOHN D. CUTTER, OF BROOKLYN, NEW YORK.

IMPROVEMENT IN MACHINES FOR MEASURING SILK IN SPOOLS.

Specification forming part of Letters Patent No. 148,185, dated March 3, 1874; application filed February 13, 1872.

*To all whom it may concern:*

Be it known that I, JOHN D. CUTTER, of Brooklyn, in the county of Kings and State of New York, have invented an Improved Mechanical Movement applicable to Machines for Measuring Silk on Spools and other purposes, of which the following is a specification:

Although as a mechanical movement applicable to other purposes or uses, it is preferred here to describe the improvement as used in connection with a machine for measuring silk or thread as the latter is wound on or unwound from spools, by means of a friction-wheel caused to bear upon the body of thread on the spool, and set in motion by the rotation of the latter to operate registering mechanism connected with said wheel. This is a purpose or use for which my improvement is particularly applicable, and will serve as well as or better than any other to illustrate its merits or peculiarities of action. The invention consists in a combination of a friction or operating wheel fast to a shaft, which has its bearing or bearings at some distance from or to one side of said pulley, within a rocking frame or hanger arranged to move around the shaft or axis of a worm-wheel, which derives its motion from a screw on the shaft.

Figure 3:
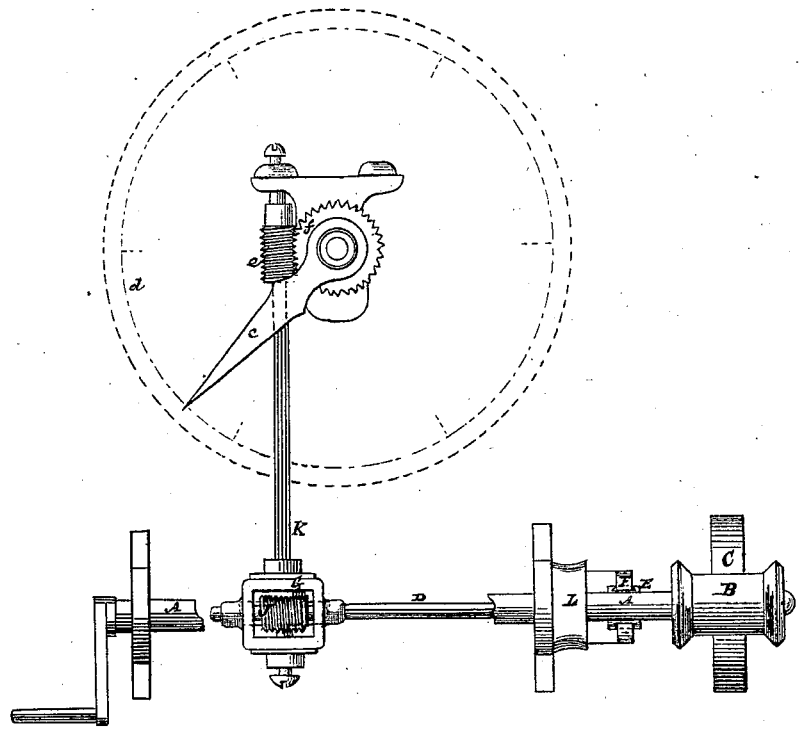
Figure 1:
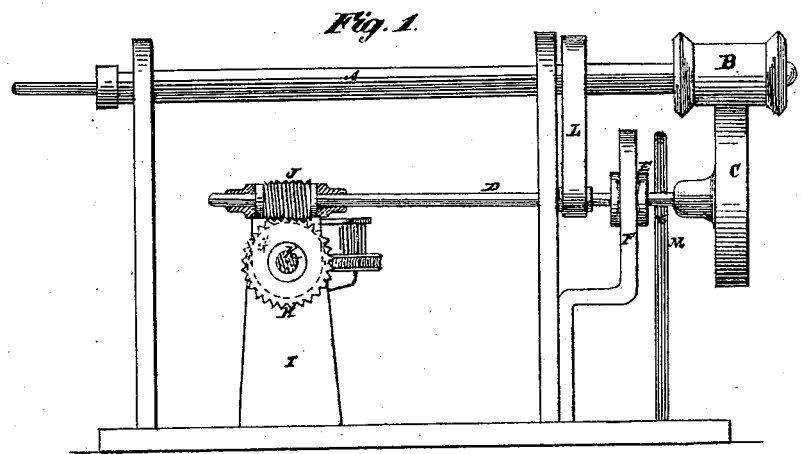
Figure 2:
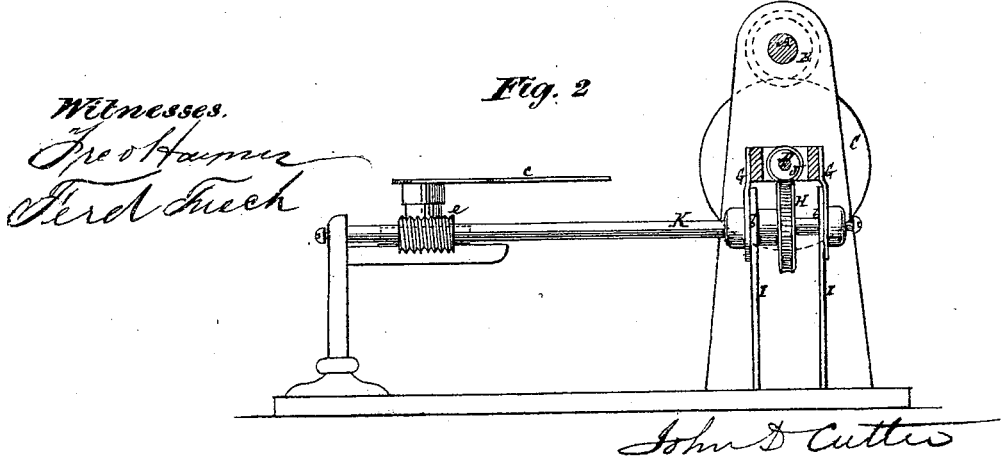

In the accompanying drawing, Figures 1 and 2 represent sectional elevations, at right angles to each other, of a silk-measuring apparatus, in part, with my improvement applied thereto. Fig. 3 is a plan of the main details of the same.

Similar letters of reference indicate corresponding parts throughout the several figures of the drawing.

A represents the revolving spool-spindle of a silk-measuring machine, and B a spool fitted on one end of said spindle. The measuring may be effected either as the thread is wound on the spool or as it is unwound therefrom by the contact with said spool of a friction wheel or pulley, C, that, being set in motion by the spool, serves to operate registering mechanism, which records the quantity of thread wound on or taken off the spool. The axial distance of this wheel or pulley from the spool-spindle is made variable, to adapt the pulley to varying quantities of thread on the spool, and to break contact of the pulley with the body of thread on the spool, when it is necessary to arrest the motion of the pulley. This is very simply provided for by my improved mechanical movement. Thus the shaft D, on the one end of which is the pulley C, is made capable of motion to and from the shaft A along with a sliding box, E, guided by a slotted standard, F, and through which the shaft D works, by supporting said shaft, at some distance from or to one side of the pulley in a rocker, G, hung to move about or around the axis or shaft of a worm-wheel, H, that revolves in fixed bearings *b* within standards I, and that gears with a screw, J, on the shaft D. This manner of hanging or supporting the shaft D of the pulley C allows of said shaft, with its screw J and friction-wheel C, rocking on or around the shaft K of the worm-wheel H as a center of motion, so that the screw always retains its proper position relatively to and gears with the worm-wheel, and the pulley C is free to vary its distance from the spool, as required. Said pulley is held in contact with the body of thread on the spool by a spring, L, of any suitable construction, and is kept out of contact when necessary, and its motion arrested—as, for instance, when the rotation of the spool is stopped by a spring-catch, M, made to clip the shaft D.

The motion communicated to the shaft K, when the pulley C is rotated by frictional contact with the body of thread on the spool, may be conveyed to an index, *c*, of a registering-dial, *d*, by a screw, *e*, and worm-wheel *f*, or by any other suitable mechanical devices, for the purpose of recording the amount of thread wound on or taken off the spool.

What is here claimed, and desired to be secured by Letters Patent, is—

The friction-wheel shaft, its pivoted supporting frame or bearing G, and screw J, combined with worm-wheel H and a registering apparatus, constructed and operated substantially as described.

JOHN D. CUTTER.

Witnesses:
   FRED. HAYNES,
   FERD. TUSCH.